(12) United States Patent
Yang et al.

(10) Patent No.: US 11,943,164 B2
(45) Date of Patent: Mar. 26, 2024

(54) MINIMIZATION OF DRIVING TEST (MDT) LOGS REPORTING METHOD AND DEVICE, MDT LOGS REPORTING CONTROL METHOD AND DEVICE, STORAGE MEDIUM, AND ELECTRONIC DEVICE

(71) Applicant: ZTE Corporation, Shenzhen (CN)

(72) Inventors: Li Yang, Shenzhen (CN); Dapeng Li, Shenzhen (CN); Jing Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 349 days.

(21) Appl. No.: 17/420,504

(22) PCT Filed: Jan. 8, 2020

(86) PCT No.: PCT/CN2020/070833
§ 371 (c)(1),
(2) Date: Jul. 2, 2021

(87) PCT Pub. No.: WO2020/143651
PCT Pub. Date: Jul. 16, 2020

(65) Prior Publication Data
US 2022/0085950 A1    Mar. 17, 2022

(30) Foreign Application Priority Data
Jan. 9, 2019    (CN) .......................... 201910020551.7

(51) Int. Cl.
*H04L 5/00* (2006.01)
*H04W 16/18* (2009.01)
(Continued)

(52) U.S. Cl.
CPC ............ *H04L 5/0053* (2013.01); *H04W 24/10* (2013.01); *H04W 76/15* (2018.02); *H04W 76/27* (2018.02)

(58) Field of Classification Search
CPC ...... H04L 5/0053; H04L 69/14; H04W 76/10; H04W 76/15; H04W 76/27; H04W 24/10; H04W 36/00; H04W 48/18; H04W 48/20
See application file for complete search history.

(56) References Cited

U.S. PATENT DOCUMENTS 9,137,697 B2 * 9/2015 Jung ..................... H04W 24/02
9,185,580 B2 * 11/2015 Jung ..................... H04W 24/02
(Continued)

FOREIGN PATENT DOCUMENTS

CN    102685793 A    9/2012
CN    103200603 A    7/2013
(Continued)

OTHER PUBLICATIONS

Catt, 3GPP TSG-RAN WG3#101bis Chengdu, China, Oct. 8-12, 2018, R3-185648.
(Continued)

*Primary Examiner* — Jenee Holland
(74) *Attorney, Agent, or Firm* — CANTOR COLBURN LLP

(57) ABSTRACT

Provided are a Minimization of Driving Test (MDT) Logs reporting method and device, a MDT Logs reporting control method and device, a storage medium, and an electronic device. UE receives first Logged MDT configuration information configured for a master base station, and receives second Logged MDT configuration information configured for at least one secondary base station; the UE exits a multi-connectivity operation mode, executes a first Logged MDT operation according to the first Logged MDT configu-
(Continued)

ration information to acquire first MDT Logs, and executes a second Logged MDT operation according to the second Logged MDT configuration information to acquire second MDT Logs; and the UE re-establishes the multi-connectivity operation mode with a current master base station and at least one current secondary base station, and reports the first MDT Logs and/or the second MDT Logs to the current master base station and/or the at least one current secondary base station.

19 Claims, 6 Drawing Sheets

(51) Int. Cl.
*H04W 24/02* (2009.01)
*H04W 24/08* (2009.01)
*H04W 24/10* (2009.01)
*H04W 76/15* (2018.01)
*H04W 76/27* (2018.01)
*H04W 92/20* (2009.01)

(56) References Cited

U.S. PATENT DOCUMENTS

| | | | | |
|---|---|---|---|---|
| 9,420,451 B2* | 8/2016 | Jung | | H04W 64/00 |
| 9,451,477 B2* | 9/2016 | Gao | | H04W 24/02 |
| 2010/0330921 A1* | 12/2010 | Kim | | H04B 17/24 |
| | | | | 455/67.11 |
| 2011/0183661 A1* | 7/2011 | Yi | | H04W 24/10 |
| | | | | 455/422.1 |
| 2012/0015657 A1* | 1/2012 | Comsa | | H04L 5/0055 |
| | | | | 455/456.6 |
| 2012/0040715 A1* | 2/2012 | Fu | | H04B 1/48 |
| | | | | 455/553.1 |
| 2012/0064886 A1* | 3/2012 | Kim | | H04W 24/04 |
| | | | | 455/423 |
| 2012/0276897 A1* | 11/2012 | Kwon | | H04B 1/1027 |
| | | | | 455/501 |
| 2012/0322386 A1* | 12/2012 | Yi | | H04W 24/08 |
| | | | | 455/67.11 |
| 2012/0329402 A1* | 12/2012 | Ren | | H04W 24/10 |
| | | | | 455/67.11 |
| 2013/0016702 A1* | 1/2013 | Yan | | H04W 24/08 |
| | | | | 370/331 |
| 2013/0072182 A1* | 3/2013 | Jung | | H04W 24/10 |
| | | | | 455/422.1 |
| 2013/0178216 A1* | 7/2013 | Chang | | H04W 24/10 |
| | | | | 455/437 |
| 2013/0196604 A1* | 8/2013 | Jung | | H04W 24/02 |
| | | | | 455/67.11 |
| 2013/0203357 A1* | 8/2013 | Chuang | | H04W 24/10 |
| | | | | 455/67.11 |
| 2013/0203358 A1* | 8/2013 | Chuang | | H04W 24/04 |
| | | | | 455/67.11 |
| 2013/0203406 A1* | 8/2013 | Chuang | | H04W 24/10 |
| | | | | 455/424 |
| 2013/0208616 A1* | 8/2013 | Thiruvenkatachari | | H04W 24/10 |
| | | | | 370/252 |
| 2013/0237211 A1* | 9/2013 | Iwamura | | H04W 24/00 |
| | | | | 455/422.1 |
| 2013/0279357 A1* | 10/2013 | Gao | | H04W 24/10 |
| | | | | 370/252 |
| 2014/0022910 A1* | 1/2014 | Zhang | | H04W 24/08 |
| | | | | 370/241.1 |
| 2014/0051428 A1* | 2/2014 | Jung | | H04W 24/08 |
| | | | | 455/422.1 |
| 2014/0051429 A1* | 2/2014 | Jung | | H04W 24/10 |
| | | | | 455/422.1 |
| 2014/0099940 A1* | 4/2014 | Kim | | H04W 24/10 |
| | | | | 455/422.1 |
| 2014/0153482 A1* | 6/2014 | Schmidt | | H04L 1/1854 |
| | | | | 370/328 |
| 2014/0220963 A1* | 8/2014 | Jung | | H04W 24/10 |
| | | | | 455/422.1 |
| 2014/0220982 A1* | 8/2014 | Jung | | H04W 8/26 |
| | | | | 455/437 |
| 2014/0228034 A1* | 8/2014 | Gao | | H04W 36/0072 |
| | | | | 455/437 |
| 2014/0301239 A1* | 10/2014 | Fukuta | | H04W 24/10 |
| | | | | 370/252 |
| 2014/0370915 A1* | 12/2014 | Jung | | G01S 5/01 |
| | | | | 455/456.1 |
| 2015/0031308 A1* | 1/2015 | Schmidt | | H04W 74/0833 |
| | | | | 455/67.11 |
| 2015/0044972 A1* | 2/2015 | Lee | | H04W 24/10 |
| | | | | 455/67.11 |
| 2015/0044973 A1* | 2/2015 | Siomina | | H04W 24/10 |
| | | | | 455/67.11 |
| 2015/0056925 A1* | 2/2015 | Jung | | H04W 24/10 |
| | | | | 455/67.11 |
| 2015/0148063 A1* | 5/2015 | Jung | | H04W 48/16 |
| | | | | 455/456.1 |
| 2015/0208267 A1* | 7/2015 | Jung | | H04W 24/10 |
| | | | | 455/456.1 |
| 2015/0223090 A1* | 8/2015 | Van Lieshout | | H04W 24/10 |
| | | | | 370/252 |
| 2015/0312850 A1* | 10/2015 | Li | | H04W 48/16 |
| | | | | 370/329 |
| 2016/0255525 A1 | 9/2016 | Li et al. | | |
| 2017/0019795 A1* | 1/2017 | Takahashi | | H04W 16/18 |
| 2017/0105136 A1* | 4/2017 | Reider | | H04W 24/10 |
| 2017/0202042 A1* | 7/2017 | Gao | | H04W 76/14 |
| 2017/0208491 A1 | 7/2017 | Xu et al. | | |
| 2017/0230781 A1* | 8/2017 | Luo | | H04W 24/10 |
| 2018/0249361 A1* | 8/2018 | Otsuki | | H04W 4/70 |
| 2018/0324624 A1 | 11/2018 | Gu et al. | | |
| 2021/0337410 A1* | 10/2021 | Hong | | H04W 8/005 |

FOREIGN PATENT DOCUMENTS

| | | |
|---|---|---|
| CN | 108521874 A | 9/2018 |
| EP | 3057354 A1 | 8/2016 |
| EP | 3419377 A1 | 12/2018 |

OTHER PUBLICATIONS

Samsung, "Use case for Minimization of Drive Testing", 3GPP TSG-RAN WG3 #101bis Chengdu, China, Oct. 8-12, 2018, R3-186104.
International Search Report for corresponding application PCT/CN2020/070833 filed Jan. 8, 2020; dated Apr. 3, 2020.
European Search Report for corresponding application EP20738161; dated Feb. 24, 2022.
Goteborg, 3GPP TSG-RAN WG3 Meeting #101, Aug. 20-24, 2018, R3-185229.
Huawei, "Support of MDT in NG-RAN", 3GPP TSG-RAN3 Meeting #101-bis Chengdu, China Oct. 8-12, 2018, R3-186026.

* cited by examiner

MINIMIZATION OF DRIVING TEST (MDT) LOGS REPORTING METHOD AND DEVICE, MDT LOGS REPORTING CONTROL METHOD AND DEVICE, STORAGE MEDIUM, AND ELECTRONIC DEVICE

This application is a National Stage Filing of the PCT International Application No. PCT/CN2020/070833 filed on 8 Jan. 2020, which claims the priority of Chinese Patent Application No. 201910020551.7, filed to the Chinese Patent Office on 9 Jan. 2019, the disclosure of which is incorporated herein by reference in its entirety.

TECHNICAL FIELD

The present disclosure relates to the field of communications, and for example, to a Minimization of Driving Test (MDT) Logs reporting method and device, a MDT Logs reporting control method and device, a storage medium, and an electronic device.

BACKGROUND

In order to reduce the cost and complexity brought to a mobile network operator when performing a manual driving test in terms of cellular network performance by adopting dedicated equipment and personnel, a Long Term Evolution-Advanced (LTE-A) system of the 4th Generation mobile communication system (4G) introduces a series of Minimization of Driving Test (MDT) functions starting from Rel-10. The MDT technology uses a plurality of pieces of User Equipment (UEs) of the LTE mode of common general users to sense, measure, collect, record and store various network performance indexes related to a UE side under the guidance of network configuration, such as driving test logs information (e.g., MDT Logs). Then, upon receiving a request message from a Radio Access Network (RAN) evolved NodeB (eNB), the UE first reports the MDT Logs to the RAN eNB by a Signaling Radio Bearer (SRB) 2 at the air interface, and then further reports the MDT Logs to a Trace Collection Entity (TCE) of a network Operation And Maintenance (OAM) system by an upstream terrestrial network interface of the eNB. The MDT Logs reported by numerous UEs may be used to assist in determining the performance reflecting the comprehensive deployment effect the network and in guiding adjustment and optimization of various function parameters of the network. For example, problems such as weak coverage and blind spots in some areas of a network can be found, and cases where the subscription cannot satisfy the requirements at some hotspot areas with high-capacity communication demand or cannot guarantee the Quality of Service (QoS) required by some user services can also be found.

In a future large heterogeneous network adopting hybrid deployment of micro cells and macro cells, there may be various types of RAN Nodes having different Radio Access Technologies (RATs), different frequency bandwidths and different wireless coverage capabilities. These different RAN Nodes may simultaneously configure a plurality of different SRBs and Data Radio Bearers (DRBs) for the UE according to requirements of different services. With regard to a UE in a multi-connectivity operation mode, how to control the collection and retrieval mode of UE MDT Logs has not been specifically regulated in the study of standard specifications in the related art.

SUMMARY

Embodiments of the present disclosure provide an MDT Logs reporting method and device, a MDT Logs reporting control method and device, a storage medium, and an electronic device, which may at least solve the problem in the related art on how to control the collection and retrieval of MDT Logs for a UE in a multi-connectivity operation mode.

According to some embodiment of the present disclosure, an MDT Logs reporting method is provided, including the following operations. UE receives first Logged MDT configuration information configured by a master base station for the UE, and receives second Logged MDT configuration information configured by one or more secondary base stations for the UE, wherein the UE is in a multi-connectivity operation mode in which the UE is connected to the master base station and the one or more secondary base stations at the same time. The UE exits the multi-connectivity operation mode, executes a first Logged MDT operation according to the first Logged MDT configuration information to acquire first MDT Logs, and executes a second Logged MDT operation according to the second Logged MDT configuration information to acquire second MDT Logs. The UE re-establishes the multi-connectivity operation mode with a current master base station and one or more current secondary base stations, and reports the first MDT Logs and/or the second MDT Logs to the current master base station and/or the one or more current secondary base stations.

According to some other embodiments of the present disclosure, a MDT Logs reporting control method is provided and includes the following operations. A master base station configures first Logged MDT configuration information for UE, and one or more secondary base stations configure second Logged MDT configuration information for the UE, wherein the UE is in a multi-connectivity operation mode in which the UE is connected to the master base station and the one or more secondary base stations at the same time. The master base station and/or the one or more secondary base stations receive first MDT Logs and/or second MDT Logs reported by the UE, wherein the first MDT Logs are MDT Logs acquired by the UE by executing a first Logged MDT operation, and the second MDT Logs are MDT Logs acquired by the UE by executing a second Logged MDT operation.

According to yet some other embodiments of the present disclosure, an MDT Logs reporting device is provided. The device is located in a UE and includes: a receiving module, configured to receive first Logged MDT configuration information configured by a master base station for the UE, and receive second Logged MDT configuration information configured by one or more secondary base stations for the UE, wherein the UE is in a multi-connectivity operation mode in which the UE is connected to the master base station and the at least one secondary base station at the same time; an executing module, configured to, after the UE exits the multi-connectivity operation mode, execute a first Logged MDT operation according to the first Logged MDT configuration information to acquire first MDT Logs, and execute a second Logged MDT operation according to the second Logged MDT configuration information to acquire second MDT Logs; and a reporting module, configured to report the first MDT Logs and/or the second MDT Logs to a current master base station and/or current one or more secondary base stations in cases where the UE re-establishes the multi-connectivity operation mode with the current master base station and the current one or more secondary base stations.

According to yet some other embodiments of the present disclosure, an MDT Logs reporting device is provided. The device is located at a network side and includes: a configuring module, configured to configure first Logged MDT configuration information for UE through a master base station, and configure second Logged MDT configuration information for the UE through one or more secondary base stations, wherein the UE is in a multi-connectivity operation mode in which the UE is connected to the master base station and the one or more secondary base stations at the same time; a receiving module, configured to receive, through the master base station and/or the one or more secondary base stations, first MDT Logs and/or second MDT Logs reported by the UE, wherein the first MDT Logs are MDT Logs acquired by the UE by executing a first Logged MDT operation, and the second MDT Logs are MDT Logs acquired by the UE by executing a second Logged MDT operation.

According to some other embodiments of the present disclosure, provided is a storage medium. The storage medium stores a computer program. The computer program is configured to execute any one of the method embodiments at runtime.

According to some other embodiments of the present disclosure, provided is an electronic device, including a memory and a processor, wherein the memory stores a computer program, and the processor is configured to run the computer program, so as to execute any one of the method embodiments.

In the described embodiments of the present disclosure, the capability and characteristics of the UE in a multi-connectivity operation mode are fully utilized, so that the UE can simultaneously execute MDT operations related to independent configurations of a plurality of master and secondary base stations, and flexibly report UE MDT Logs by utilizing a plurality of signaling radio bearers.

BRIEF DESCRIPTION OF THE DRAWINGS

The drawings illustrated herein are intended to provide better understanding of the present disclosure, and constitute a part of the present disclosure. The schematic embodiments of the present disclosure and the description thereof are used to explain the present disclosure, but not to limit the present disclosure improperly. In the drawings.

DETAILED DESCRIPTION OF THE EMBODIMENTS

The present disclosure will be described in detail below using some embodiments with reference to the accompanying drawings. It should be noted that, without conflict, the embodiments and the features of embodiments of the present disclosure can be combined.

Figure 1:
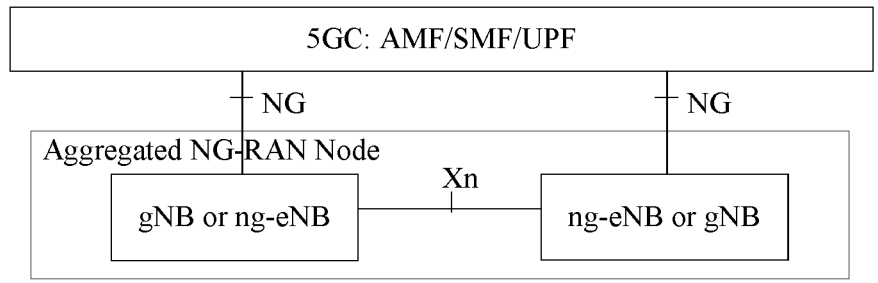
FIG. 1 is a schematic diagram of a network architecture of an aggregated Next Generation-RAN (NG-RAN) Node according to the related art (Central Unit (CU)/Distributed Unit (DU) split)
Figure 2:
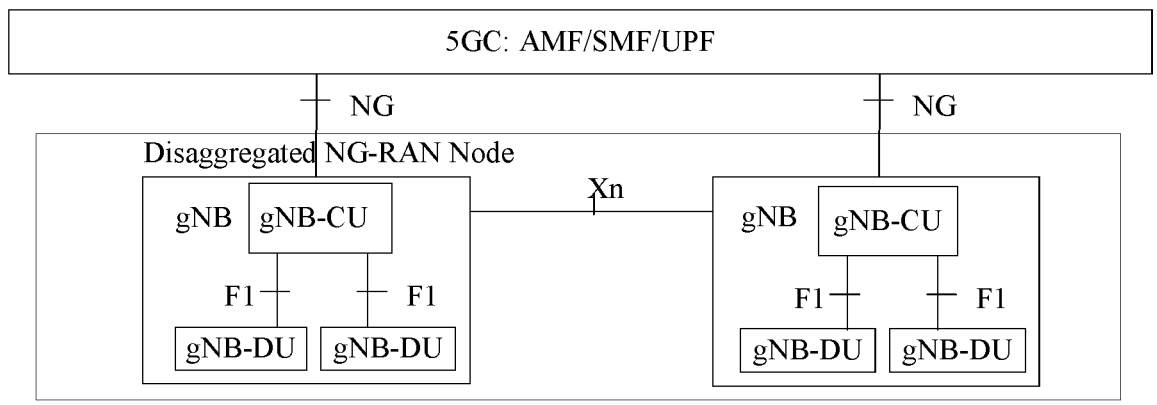
FIG. 2 is a schematic diagram of a network architecture of a disaggregated gNB according to the related art (CU/DU split)

As a continuation of the development of the fourth generation terrestrial-based 4G LTE cellular mobile communication system, the fifth generation terrestrial-based 5G cellular mobile communication system includes two major subsystems: a next generation core network 5GC (5G Core) and a Next Generation Radio Access Network (NG-RAN). The 5GC includes a network node such as an Access Mobility Function (AMF), a Session Management Function (SMF) and a User Plane Function (UPF). The NG-RAN at least includes two base stations of different Radio Access Technologies (RATs), i.e. a next generation eNB (ng-eNB) (the air interface still supporting Evolved-Universal Terrestrial Radio Access (E-UTRA) RAT) which is provided according to the smooth evolution based on a 4G eNB, and gNB (the air interface supporting a New Radio (NR) RAT) with a new physical layer air interface design, and interfaces between related network elements. An NG-RAN Node (an eNB or an ng-eNB) is connected to the 5GC (including an NG-C control plane connection (used for signaling transmission) and an NG-U user plane connection (used for user data transmission)) by means of a standardized NG interface, and the NG-RAN Nodes (the eNB or the ng-eNB) are connected to one another by means of an Xn interface (including an Xn-C control plane connection and an Xn-U user plane connection). FIG. 1 is an architecture diagram illustrating a situation where an aggregated NG-RAN Node adopts air interface protocol stack of CU/DU split. FIG. 2 is an architecture diagram illustrating a situation where a disaggregated NG-RAN Node adopts air interface protocol stack of CU/DU split. Taking the gNB-CU/DU split supported by the 3rd Generation Partnership Project (3GPP) protocol as an example, a single gNB is split into a single gNB-CU and a plurality of gNB-DU network node entities which are in connection with each other through a standardized F1 interface, and such connection includes an F1-C control plane connection and an F1-U user plane connection. The gNB with CU/DU split and the gNB/ng-eNB without the CU/DU split still adopt the NG interface and the Xn interface. The control plane connection of the network interface is used for transmitting control signaling messages between network nodes, and the user plane connection is used for transmitting user service data (packets). A Next Generation Access Point (NGAP), an XnAP and an F1AP are respectively logical network application layer protocols for NG-C, Xn-C and F1-C control plane Radio Network Layer (RNL), and transmit control signaling of a corresponding interface on the basis of a transport network layer (TNL) transmission bearer (Stream Control Transmission Protocol (SCTP) connection). For the user service data frames of the NG-U, Xn-U and F1-U user plane interfaces, the user service data (packets) of the corresponding interface are transmitted on the basis of the TNL transmission bearer (General Packet Radio Service Tunneling Protocol (GTP)-U tunnel) of the lower network layer.

Figure 3:
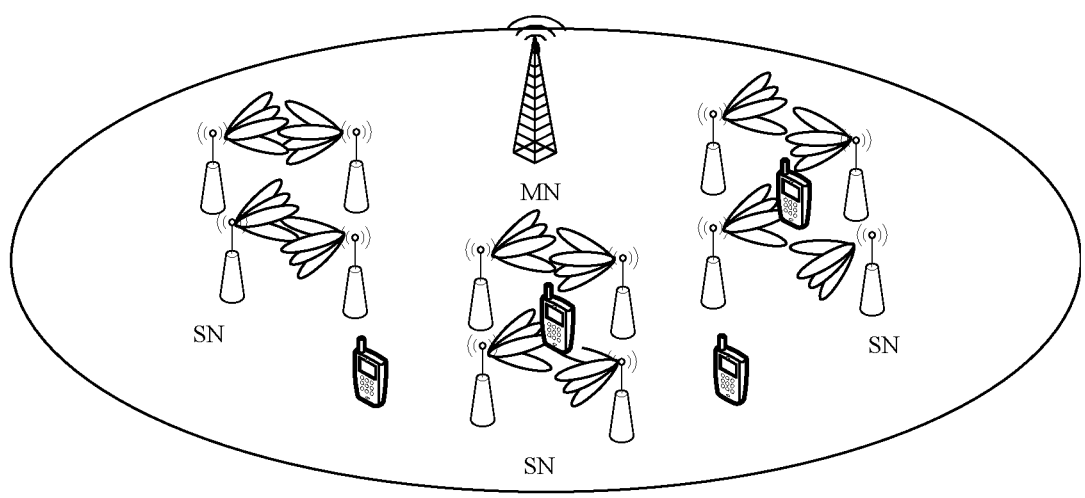
FIG. 3 is a schematic diagram of a heterogeneous network in which macro cells and micro cells of different RATs are deployed according to the related art.

In a future large heterogeneous network adopting hybrid deployment of micro cells and macro cells, there may be various types of RAN Nodes having different Radio Access Technologies (RATS), different frequency bandwidths and different wireless coverage capabilities, for example, network nodes such as legacy eNB, gNB, ng-eNB, and Wireless Local Area Network (WLAN) AP. As shown in FIG. 3, in a certain physical area, a Master Node (MN) is usually used for providing wireless macro coverage, and in a local hotspot or a weak coverage area, a plurality of Secondary Nodes (SNs) are used for providing enhanced micro coverage, so as to improve network capacity and performance. These different types of RAN Nodes can provide radio access functions of different capabilities and different performances for UEs. The RAN Nodes and the UE are in connection with each other by a 3GPP standardized Uu air interface (i.e., the radio air interface), and the connection includes an air interface control plane connection bearer SRB (Signaling Radio Bearer, used for transmitting air interface control signaling) and an air interface user plane connection bearer DRB (Data Radio Bearer, used for transmitting an air interface user service data packet). The RAN Node may simultaneously configure a plurality of different SRBs and DRBs for the UE according to requirements of different services.

In order to reduce the cost and complexity brought to a mobile network operator when performing a manual driving test in terms of cellular network performance by adopting dedicated equipment and personnel, a series of Minimization of Driving Test (MDT) functions are introduced from the Rel-10 version of the 4G LTE-A system. The MDT technology uses a plurality of pieces of UEs of the LTE mode of common general users to sense, measure, collect, record and store various network performance indexes related to a UE side under the guidance of network configuration, such as MDT Logs. Then, upon receiving a request message from an RAN eNB, the UE first reports the MDT Logs to the RAN eNB by an SRB2 at the air interface, and then further reports the MDT Logs to a Trace Collection Entity (TCE) of a network Operation And Maintenance (OAM) system by an upstream terrestrial network interface of the eNB. The TCE is usually located in an MME core network entity of a 4G LTE in the past, but may also be deployed independent of a 5GC core network entity in the future. The MDT Logs reported by numerous UEs may be used to assist in determining the performance reflecting the comprehensive deployment effect the network and in guiding adjustment and optimization of various function parameters of the network. For example, problems such as weak coverage and blind spots in some areas of a network can be found, and cases where the subscription cannot satisfy the requirements at some hotspot areas with high-capacity communication demand or cannot guarantee the Quality of Service (QoS) required by some user services can also be found.

The MDT can be classified into a Management based MDT and a Signaling based MDT based on a manner of providing an MDT-related parameter configuration by the network side. In the activation process of the Management based MDT, the OAM directly sends, to the target eNB, a Trace session activation message containing the MDT parameter configuration, and the eNB selects appropriate target UE in an MDT valid area specified by the Trace session activation message and sends the MDT parameter configuration information to the selected target UE. In the activation process of the Signaling based MDT, the OAM first sends a Trace session activation including the MDT parameter configuration to an Home Subscriber Server (HSS, which is also referred to as a location register) to activate MDT measurement of specified target UE, then the HSS sends the MDT parameter configuration information of the UE to a core network, the core network then sends the MDT configuration information of the UE to the target eNB, the eNB finally sends the MDT parameter configuration information to the target UE to perform the MDT.

Figure 4:
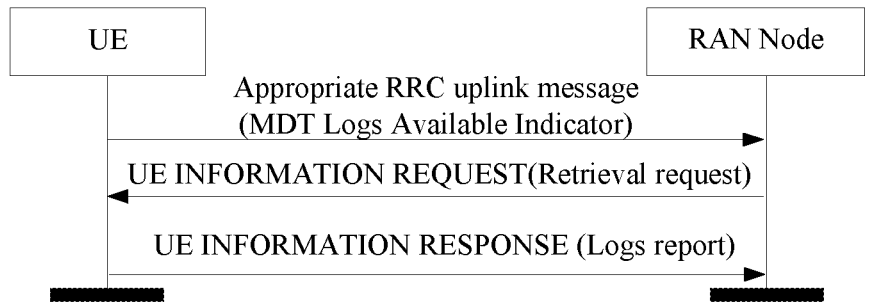
FIG. 4 is a flowchart of a single RAN Node retrieving MDT Logs from UE via a Radio Resource Control (RRC) signaling procedure according to the related art.

The MDT can be classified into a Logged MDT (corresponding to a UE in an idle state (RRC_IDLE) or in an inactive state (RRC_INACTIVE)) and an Immediate MDT (corresponding to a UE in a connection state (RRC_CONNECTED)) according to an RRC state in which the UE executes MDT tasks. Logged MDT refers to: in an RRC_IDLE or RRC_INACTIVE state, the UE periodically executes various types of Logged MDT measurement tasks according to previous network MDT related parameter configuration (e.g. the specific measurement object, various measurement amounts, a measurement effective physical range, a measurement effective time and a period, etc. of the MDT), and records and stores MDT Logs. When the UE later transits back to the RRC_CONNECTED state, the UE sends an "MDT Logs available indicator" to the RAN Node via an appropriate RRC uplink message, so as to indicate that the UE has measured, recorded and stored some MDT Logs, and request the RAN Node to retrieve the MDT Logs. If necessary, the RAN Node retrieves, at an appropriate time, the UE MDT Logs by a UE Information procedure at the air interface. Specifically, as shown in FIG. 4, the RAN Node sends a UE INFORMATION REQUEST message to the UE to request the UE to report the stored MDT Logs, and then the UE reports all or a part of the MDT Logs by one or more UE Information RESPONSE messages (depending on the size of the MDT Logs table). According to the current LTE protocol, the above UE Information procedure at the air interface is limited to be performed only on the SRB2 bearer at the master base station. After receiving the MDT Logs, the RAN Node aggregates and further forwards the MDT Logs to an upstream TCE for analysis and processing.

The MDT can be substantively divided into three types according to different protocol layer attributes for measurement. A first type is L1 signal measurement, for example, statistic measurement of the strength RSRP (Reference Signal Receiving Power) and the RSRQ (Reference Signal Receiving Quality) of the LTE downlink pilot signal (Common Reference Signal (CRS); or Channel State Information-Reference Signal (CSI-RS)). A second type is L2 performance measurement, for example, statistical measurement of delay/packet loss ratio/packet loss amount of protocol data unit (PDU) data packets, such as LTE MAC (Medium Access Control)/RLC (Radio Link Control)/PDCP (Packet Data Convergence Protocol). A third type is L3 performance measurement, for example, establishment and maintaining of an LTE RRC connection of a UE, and statistical measurement of indexes such as a data throughput rate (Throughput) of a specific data radio bearer (DRB) and other mobility-related performance (switching, call drop, etc.).

Based on the basic framework principle and operation mode of the above LTE MDT technology, the MDT technology corresponding to the 5G NG-RAN is also basically similar, but is also under the study of the 3GPP standard specification. The 5G NG-RAN at least also supports a Logged MDT function, and the basic operating principle of the Logged MDT function supported by 5G NG-RAN is basically similar to that of the LTE Logged MDT. However, the 5G NG-RAN and the LTE have the following important differences in terms of the technical background and the system capability condition in which the MDT-related functions are introduced respectively.

Figure 5:
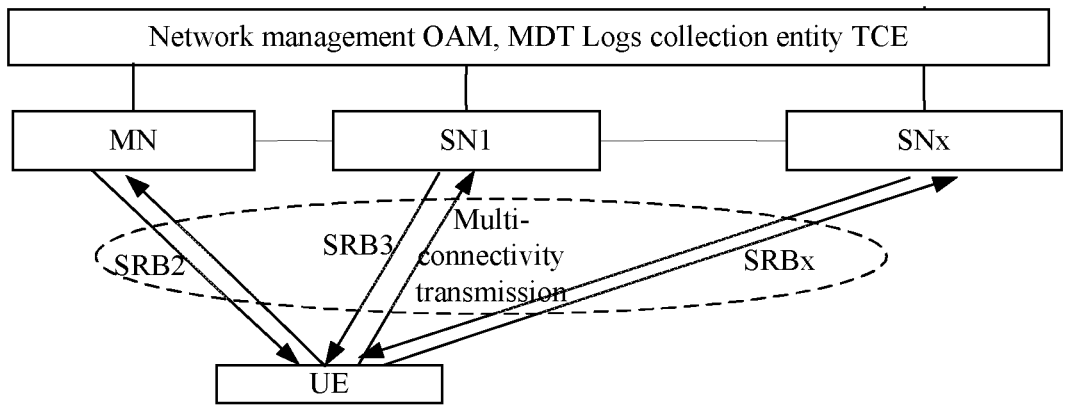
FIG. 5 is a schematic diagram of configuration of multiple SRBs of UE in a multi-connectivity transmission mode according to some embodiments of the present disclosure.

1) When the LTE Logged MDT function is introduced in Rel-10, there is no concept of UE (dual) multi-connectivity, therefore only a single base station currently serving the UE can retrieve the UE MDT Logs via a UE Information procedure based on SRB2. In contrast, when a 5G NG-RAN Logged MDT function is introduced in the future, there is already the concept of UE (dual) multi-connectivity, i.e., a Multi-RAT Dual Connectivity (MR-DC) function of a 5G Rel-15, and therefore it can be considered to use a plurality of master and secondary nodes currently serving the UE to simultaneously or cooperatively retrieve the UE MDT Logs, so as to realize isolation between serving nodes retrieving the MDT Logs and load balancing of air interface signaling. For example, as shown in FIG. 5, in addition to an SRB2 between the UE and the single MN, more signaling radio bearers such as an SRB3/SRBx may be configured between the UE in a multi-connectivity operation mode and one or more SNs at the same time, and these signaling radio bearers can also be used for retrieving the MDT Logs.

2) A 4G LTE system is of a single E-UTRA RAT, and the MDT Logs generated by various MDT measurement tasks based on an eNB-related configuration can only be finally reported to eNBs in the same RAT, but cannot be reported to other base stations of different RATs, such as a 2G Base Station Controller (BSC) or a 3G Radio Network Controller (RNC). In contrast, the 5G NG-RAN is formed by a mixture of multiple RATs (including at least an E-UTRA and an NR at present), and therefore it can also be considered that the MDT Logs generated by an MDT measurement task performed based on configuration related to a base station of a certain RAT can also finally be flexibly reported to base stations of different RATs, without being limited to always reporting the MDT Logs to base stations of the same RAT.

3) The LTE Logged MDT-related configuration cannot be validated and executed simultaneously with the related configuration of RAN Nodes of other RATs, for example, the UE cannot perform the Logged MDT operation simultaneously on the basis of the respective MDT configurations of the 3G RNC and the 4G eNB. In contrast, in the MR-DC multi-connectivity operation of the 5G NG-RAN, the RAN Nodes of different RATs can independently configure and simultaneously validate the MDT parameter configuration. That is, the UE can perform the operations of the Logged MDT simultaneously on the basis of the MDT-related configurations of the MN and the SN, the UE can independently perform an MDT operation according to related configurations of RAN Nodes of different RATs, and generate a plurality of pieces of decoupled Per Node/RAT MDT Logs (table).

In view of the differences in technical backgrounds and capabilities of the UE in the multi-connectivity operation mode, the following embodiments of the present disclosure provide a technical solution for controlling the collection and retrieval mode of the UE MDT Logs with regard to a UE in a multi-connectivity operation mode.

It should be noted that the terms "first", "second" etc., in the following embodiments of the present disclosure are used to distinguish similar objects, and are not necessarily used to describe a specific sequence or order.

Figure 6:
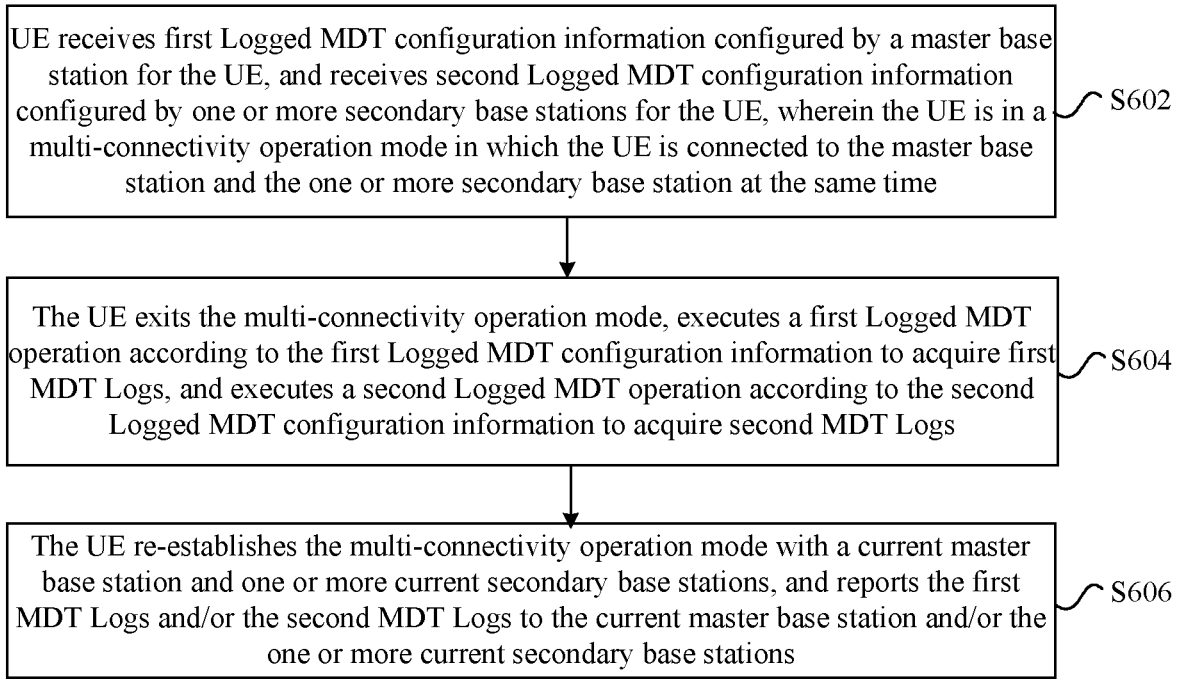
FIG. 6 is a flowchart of a MDT Logs reporting method according to some embodiments of the present disclosure.

The present embodiment provides an MDT Logs reporting method. FIG. 6 is a flowchart according to some embodiments of the present disclosure. As shown in FIG. 6, the flow includes operations S602 to S606 which are described in detail as follows.

In operation S602, UE receives first Logged MDT configuration information configured by a master base station for the UE, and receives second Logged MDT configuration information configured by one or more secondary base stations for the UE, wherein the UE is in a multi-connectivity operation mode in which the UE is connected to the master base station and the one or more secondary base stations at the same time.

In operation S604, the UE exits the multi-connectivity operation mode, executes a first Logged MDT operation according to the first Logged MDT configuration information to acquire first MDT Logs, and executes a second Logged MDT operation according to the second Logged MDT configuration information to acquire second MDT Logs.

In operation S606, the UE re-establishes the multi-connectivity operation mode with a current master base station and one or more current secondary base stations, and reports the first MDT Logs and/or the second MDT Logs to the current master base station and/or the one or more current secondary base stations.

In the embodiments, the capability and features of the UE in a multi-connectivity operation mode are fully utilized, so that the UE can simultaneously execute related MDT operations independently configured by a plurality of master and secondary base stations, and flexibly report the UE MDT Logs by utilizing a plurality of independent signaling radio bearers.

In operation S606 of the embodiments, the current master base station and the current secondary base station that re-establish the multi-connectivity operation mode with the UE may be the same master base station and secondary base station as those in operation S604, or may be different from those in operation S604.

Figure 7:
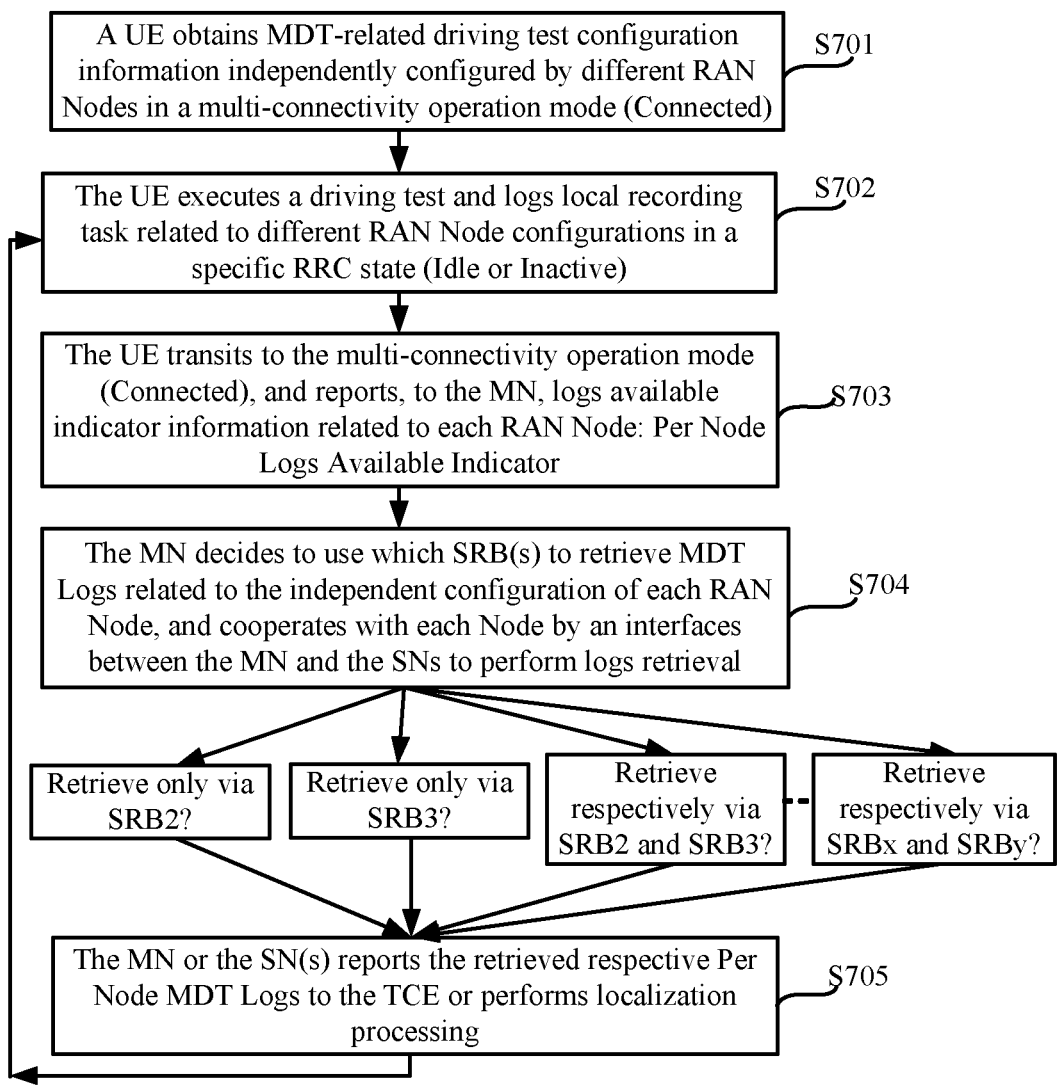
FIG. 7 is a flowchart of retrieving MDT Logs related to different RAN Node configurations via different SRBs according to some embodiments of the present disclosure.

The MDT Logs reporting method according to the embodiments of the present disclosure will be described below with reference to an exemplary embodiment. As shown in FIG. 7, the embodiment includes operations S701 to S705 which are described in detail as follows.

In operation S701, UE is in a multi-connectivity operation mode (RRC Connected state), i.e., the UE is connected to an MN and several SNs at the same time. The MN and the SNs respectively perform, for the UE, decoupled Per Node/RAT MDT-related configuration independently (based on different RRC states in which an MDT task is executed, the configuration may include a Logged MDT-related configuration or an Immediate MDT-related configuration). After successful configuration by the network side, the UE obtains Per Node/RAT MDT-related driving test configuration information independently configured by the master and secondary base stations, and prepares for subsequent operations of Logged MDT and Immediate MDT.

In operation S702, after leaving the connected state, the UE stores the previous related independent configuration parameters of the respective Logged MDT of the MN and SNs. The UE in the RRC Idle or Inactive state will perform the task of recording the MDT Logs locally corresponding to the respective Per Node/RAT MDT configuration of the master base station. The MDT Logs (table) generated based on the related Per Node/RAT MDT configuration of the MN and SNs can be respectively stored in different MDT Logs tables and distinguished by identifiers (id).

In operation S703, when the UE transits back to the connected state or transits to the multi-connectivity operation mode, the UE reports, to the current serving MN by means of an SRB1 bearer, logs available indicator information related to Per Node/RAT MDT configurations for the master and secondary base stations: Per Node/RAT Logs Available Indicator (For MN and/or SN(s)), so that the MN can learn the condition of the MDT Logs table which has been stored by the current UE. The Per Node/RAT MDT configuration parameter for each of the master and secondary base stations may correspond to an independent MDT Logs table. If the UE is already in the multi-connectivity operation mode, the UE can directly report, to the current serving SN(s) by means of an SRB3/x bearer, logs available indicator information related to the Per Node/RAT MDT configuration for the corresponding secondary base station: Per Node/RAT Logs Available Indicator (For SN(s)), so that the SN(s) can learn the condition of the MDT Logs table, which has been stored by the current UE, related to the SN.

In operation S704, the MN decides to use which SRB(s) to retrieve MDT Logs (table) related to the independent configuration of each RAN Node, and uses a network interface procedure message between the MN and the SN(s) to cooperate with each RAN Node to perform retrieval of UE MDT Logs. The MN also needs to determine whether a network interface connection is configured between the SN(s) and the TCE, wherein the SN(s) can be used for directly reporting the MDT Logs. The MN also needs to decide whether the SN(s) needs to forward the MDT Logs retrieved from the UE to the MN node for aggregation, and then reports the MDT Logs to the TCE.

In the above embodiment, if the UE is already in the multi-connectivity operation mode, the retrieval operations of the master and secondary base stations (e.g., MN/SN(s)) are as follows.

1) If the MN decides to use its own SRB2 to retrieve all UE MDT Logs, the MN will initiate a UE Information procedure only on the SRB2, and retrieve the MDT Logs information related to the independent configurations for all RAN Nodes of the MN and the SN(s) from the UE, and further reports the retrieved MDT Logs information to the TCE.

In some embodiments, if the SN(s) and the MN are nodes of different RATs, a message UE INFORMATION RESPONSE sent via the SRB2 will carry the MDT Logs related to the configuration of the SN(s) in the form of an information element of a Radio Resource Control Container (RRC Container).

2) If the MN decides to retrieve the UE MDT Logs only via the SRB3 of the SN1, the MN instructs the SN1 to initiate a UE Information procedure on the SRB3, and retrieve the MDT Logs information related to independent configurations of all RAN Nodes of the MN and the SN(s) from the UE. The MN will not initiate a UE Information procedure on its own SRB2.

In some embodiments, the MN needs to notify, via a network interface procedure message between the MN and the SN1, the SN1 of logs available indicator information related to independent configurations of all the RAN Nodes: Per Node/RAT Logs Available Indicator (For MN and/or SN(s)), and instructs the SN1 to initiate a UE Information procedure on the SRB3.

In some embodiments, the MN needs to notify, by a network interface flow message between the MN and the SN1, the SN1 of whether to forward to the MN all MDT Logs retrieved from the UE, or whether to prepare to directly report the MDT Logs to the upstream TCE.

In some embodiments, if the SN(s) and the MN are base stations of different RATs, a message UE INFORMATION RESPONSE sent via the SRB3 will carry the MDT Logs related to the configuration of the MN in the form of an information element of an RRC container.

3) If the MN decides to use the SRB2 and the SRB3 to cooperatively retrieve the UE MDT Logs at the same time, the MN will initiate a UE Information procedure on the SRB2, and will retrieve, from the UE, the MDT Logs only related to the independent configuration of the MN; at the same time, the MN will also instruct the SN1 to initiate a UE Information procedure on SRB3, and retrieve, from the UE, the MDT Logs only related to the independent configuration of SN1. By the same reasoning, the MN needs to notify, via a network interface procedure message between the MN and the SN1, the SN1 of logs available indicator information related to the independent configuration of SN1: Per Node/RAT Logs Available Indicator (for SN1), and instructs the SN1 to initiate a UE Information procedure on the SRB3. The MN needs to notify, by a network interface flow message between the MN and the SN1, the SN1 of whether to forward to the MN the MDT Logs retrieved from the UE, or to prepare to directly report the MDT Logs to the upstream TCE.

4) If there are a plurality of secondary base stations (e.g., SNx/SNy), similarly, if the MN decides to retrieve the UE MDT Logs via the SRBx and SRBy corresponding to the SNx/SNy at the same time, the MN will also instruct the SNx and SNy to initiate a UE Information procedure on each of the corresponding SRBx and SRBy, and respectively retrieve the MDT Logs related to independent configurations of SNx and SNy. By the same reasoning, the MN needs to notify, by a respective network interface procedure message between the MN and the SNx/SNy, the SNx/SNy of related logs available indicator information: Per Node/RAT Logs Available Indicator (for SNx/SNy), and instructs the SNx/SNy to initiate a UE Information procedure on the SRBx and the SRBy respectively. The MN needs to notify, by a network interface flow message between the MN and the SNx/SNy, the SNx/SNy of whether to forward to the MN the MDT Logs retrieved from the UE, or to prepare to directly report the MDT Logs to the upstream TCE.

In operation S705, the MN or the SN(s) directly reports, to different or same TCE entities connected to the MN or the SN(s), the retrieved MDT Logs related to the Per Node/RAT MDT configurations, or performs local processing in each base station.

In some embodiments, according to the instruction of the MN, the SN(s) may also forward, by a network interface process message between the MN and the SN(s), all or part of the MDT Logs retrieved from the UE to the MN for further processing.

In the embodiments of the present disclosure, the capability and features of configuration of the UE in a multi-connectivity operation mode are fully utilized, so that the UE can simultaneously execute MDT operations related to Per Node/RAT independent configurations of a plurality of master and secondary base stations, and flexibly report the UE MDT Logs by utilizing a plurality of signaling radio bearers. The plurality of master and secondary base stations can cooperate with each other via a network interface procedure message, and flexibly exchange their respective Per Node/RAT MDT configurations and MDT Logs.

Different retrieval modes of the MDT Logs adopted by the MN/SN(s) will be described in detail hereinafter with reference to exemplary embodiments.

Embodiment 1

In the embodiment, the UE is in an E-UTRA NR-Dual Connectivity (EN-DC) operation mode, i.e., the UE is connected to a master base station (e.g., MeNB) and a secondary base station (e.g., SgNB1) at the same time. The MeNB and the SgNB1 at the network side respectively configure the UE with Logged MDT-related configuration information (e.g. the target E-UTRA and NR frequency points to be detected, effective physical and temporal range, etc.) independently according to the requirements of their respective RAT deployment and network management, and then the UE stores the Per Node/RAT Logged MDT-related configuration information of the MeNB and the SgNB1.

Figure 8:
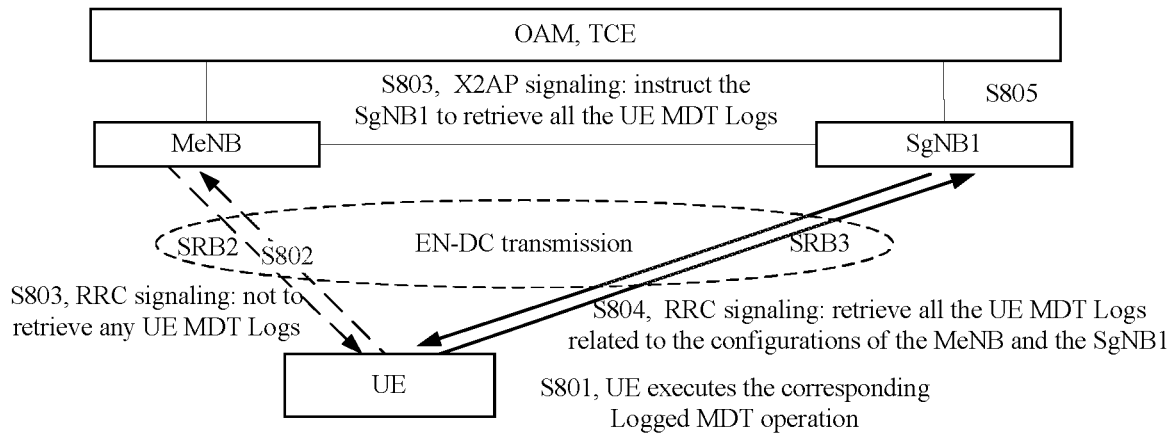
FIG. 8 is a flowchart of retrieving all the UE MDT Logs via the SRB3 according to embodiment 1 of the present disclosure.

As shown in FIG. 8, the embodiment includes operations S801 to S805 which are described in detail as follows.

In operation S801, when transmission of user plane data ends, UE exits an EN-DC operation mode, transits to an RRC Idle state, starts to execute Logged MDT operations respectively corresponding to Per Node/RAT related configurations of the MeNB and the SgNB1, and respectively records and stores MDT Logs in a local table 1 and a local table 2 in a manner of being decoupled from one another.

In operation S802, transmission of user plane data restarts, the UE transits back to the RRC Connected state and quickly transits to the EN-DC operation mode, and the UE reports the Per Node/RAT Logs Available Indicator (for the MeNB and the SgNB1) to the MeNB via an SRB1: RRC Connection Setup Complete message, indicating that the local tables 1 and 2 of the UE respectively record and store MDT Logs, which are respectively generated based on the configurations of the MeNB and the SgNB1, to be retrieved by the network side.

In operation S803, the MeNB decides to use the SRB3 of the SgNB1 to retrieve all UE MDT Logs, and thus sends an X2AP: UE INFORMATION REQUEST message to the SgNB1 by a UE Information procedure newly introduced on the X2AP. The message includes Per Node/RAT Logs Available Indicator (for MeNB and SgNB1), which is used for requesting the SgNB1 to retrieve all UE MDT Logs related to the configurations of the MeNB and SgNB1. The X2AP: UE INFORMATION REQUEST message sent by the MeNB also instructs the SgNB1 to directly upload all the retrieved MDT Logs to the TCE by an appropriate procedure, without returning the MDT Logs to the MeNB.

In operation S804, according to the instruction of the X2AP message of the MeNB, the SgNB1 retrieves all UE MDT Logs related to the configurations of the MeNB and SgNB1. After successful retrieval, the SgNB1 sends to the MeNB an X2AP: UE INFORMATION RESPONSE message including a Per Node/RAT Logs Retrieval Success Indicator (for the MeNB and the SgNB1), notifying that the MeNB has successfully retrieved all the UE MDT Logs.

In operation S805, the SgNB1 aggregates all the retrieved UE MDT Logs and then directly reports the aggregated MDT Logs to an upstream TCE directly connected to the SgNB1 for processing. In the process that the MeNB and SgNB1 cooperate to retrieve MDT Logs, there is no need for the MeNB to retrieve or report to the TCE any UE MDT Logs via its own SRB2 anymore.

Embodiment 2

In the embodiment, the UE is once in an EN-DC operation mode, that is, the UE is connected to both a master base station (e.g., MeNB) and a secondary base station (e.g., SgNB1) at the same time. The MeNB and the SgNB1 at the network side respectively configure the UE with Logged MDT-related configuration information (e.g. the target E-UTRA and NR frequency points to be detected, effective physical and temporal range, etc.) independently according to the requirements of their respective RAT deployment and network management, and then the UE stores the Per Node/RAT Logged MDT-related configuration information of the MeNB and the SgNB1.

Figure 9:
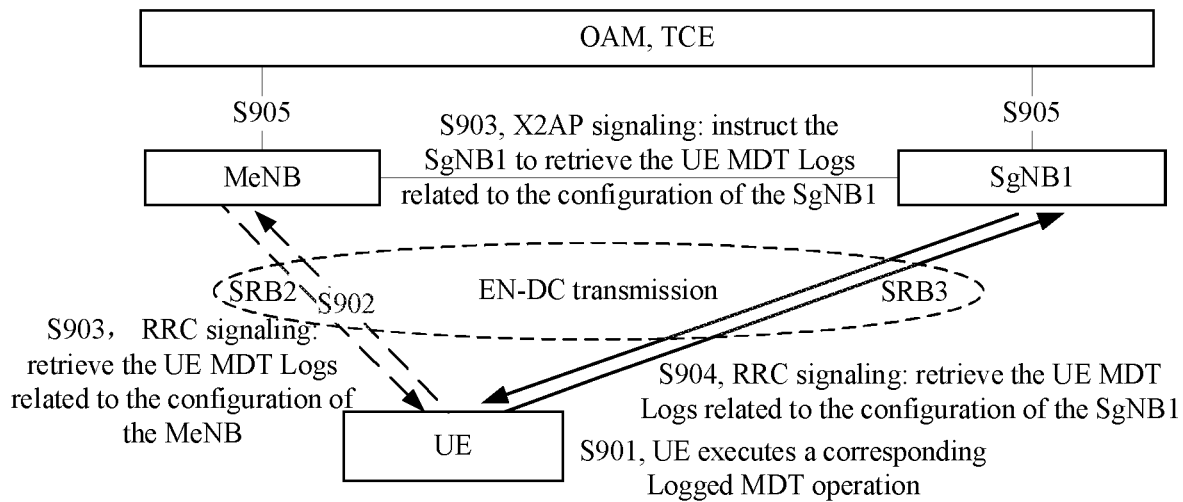
FIG. 9 is a schematic diagram of retrieving UE MDT Logs via SRB2 and SRB3 respectively according to embodiment 2 of the present disclosure.

As shown in FIG. 9, the embodiment includes operations S901 to S905 which are described in detail as follows.

In operation S901, when transmission of user plane data ends, UE exits an EN-DC operation mode, transits to an RRC Idle state, starts to execute Logged MDT operations respectively corresponding to Per Node/RAT related configurations of the MeNB and the SgNB1, and respectively records and stores MDT Logs in a local table 1 and a local table 2 in a manner of being decoupled from one another.

In operation S902, transmission of user plane data restarts, the UE transits back to the RRC Connected state and quickly transits to the EN-DC operation mode, and the UE reports the Per Node/RAT Logs Available Indicator (for the MeNB and the SgNB1) to the MeNB via an SRB1: RRC Connection Setup Complete message, indicating that the local tables 1 and 2 of the UE respectively record and store MDT Logs, which are respectively generated based on the configurations of the MeNB and the SgNB1, to be retrieved by the network side.

In operation S903, the MeNB decides to respectively use the SRB2 of the MeNB and the SRB3 of the SgNB1 to cooperatively retrieve the UE MDT Logs, and thus sends an X2AP: UE INFORMATION REQUEST message to the SgNB1 by a UE Information procedure newly introduced on the X2AP. The message includes a Per Node/RAT Logs Available Indicator (for SgNB1), which is used for requesting the SgNB1 to retrieve the UE MDT Logs related to the configuration of the SeNB1. The X2AP: UE Information Request message sent by the MeNB also instructs the SgNB1 to directly upload the retrieved MDT Logs to the TCE subsequently by an appropriate procedure, without returning the MDT Logs to the MeNB. Meanwhile, the MeNB retrieves the UE MDT Logs related to the configuration of the MeNB via SRB2 of the MeNB, and subsequently directly uploads the MDT Logs to the TCE by an appropriate procedure.

In operation S904, according to the instruction of the X2AP message of the MeNB, the SgNB1 retrieves the UE MDT Logs related to the configuration of the SgNB1 by a UE Information procedure at the air interface on SRB3 of the SgNB1. After successful retrieval, the SgNB1 sends to the MeNB an X2AP: UE INFORMATION RESPONSE message including a Per Node/RAT Logs Retrieval Access Indicator (for SgNB1), notifying that the MeNB has successfully retrieved the UE MDT Logs related to the configuration of the SgNB1.

In operation S905, the MeNB and the SgNB1 aggregate the retrieved UE MDT Logs and directly report the MDT Logs to the upstream TCE directly connected to the MeNB and the SgNB1 for processing. In the process that the MeNB and SgNB1 cooperate to retrieve MDT Logs, the MeNB still needs to retrieve and report to the TCE the UE MDT Logs via its own SRB2.

Embodiment 3

In this embodiment, the UE is once in a NR-DC operation mode, that is, the UE is connected to both a master base station (e.g., MgNB) (low frequency) and a secondary base station (e.g., SgNB1) (high frequency). The MgNB and the SgNB1 at the network side respectively configure the UE with Logged MDT-related configuration information (such as target NR high/low frequency points to be detected, effective physical and temporal ranges, etc.) independently according to the requirements of their respective RAT deployment and network management, and then the UE stores the Per Node/RAT Logged MDT-related configuration information of the MgNB and the SgNB1.

Figure 10:
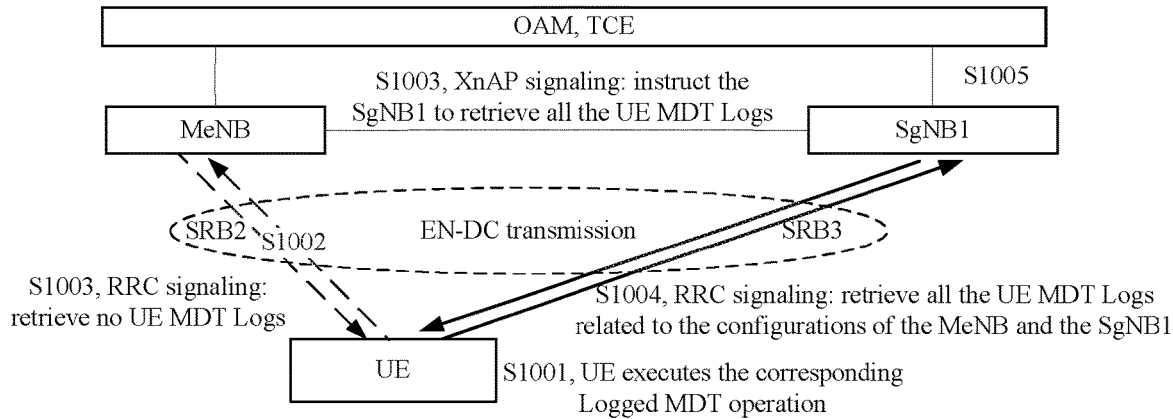
FIG. 10 is a flowchart of retrieving all the UE MDT Logs via the SRB3 according to embodiment 3 of the present disclosure.

As shown in FIG. 10, the embodiment includes operations S1001 to S1005 which are described in detail as follows.

In operation S1001, when transmission of user plane data ends, UE exits an NR-DC operation mode, transits to an RRC Inactive state, starts to execute Logged MDT operations respectively corresponding to Per Node/RAT related configurations of the MgNB and the SgNB1, and respectively records and stores MDT Logs in a local table 1 and a local table 2 in a manner of being decoupled from one another.

In operation S1002, transmission of user plane data restarts, the UE transits back to the RRC Connected state and quickly transits to the NR-DC operation mode, and the UE reports the Per Node/RAT Logs Available Indicator (for the MgNB and the SgNB1) to the MgNB via an SRB1: RRC Resume Complete message, indicating that the local tables 1 and 2 of the UE respectively record and store MDT Logs, which are respectively generated based on the configurations of the MgNB and the SgNB1, to be retrieved by the network side.

In operation S1003, the MgNB decides to use the SRB3 of the SgNB1 to retrieve all UE MDT Logs, and thus sends an XnAP: UE INFORMATION REQUEST message to the SgNB1 by a UE Information procedure newly introduced on the XnAP. The message includes Per Node/RAT Logs Available Indicator (for MgNB and SgNB1), which is used for requesting the SgNB1 to retrieve all UE MDT Logs related to the configurations of the MgNB and the SgNB1. The XnAP: UE INFORMATION REQUEST message sent by the MgNB also instructs the SgNB1 to directly upload all the retrieved MDT Logs to the TCE by an appropriate procedure, without returning the MDT Logs to the MgNB.

In operation S1004, according to the instruction of the XnAP message of the MgNB, the SgNB1 retrieves all UE MDT Logs related to the configurations of the MgNB and the SgNB1. After successful retrieval, the SgNB1 sends to the MgNB an XnAP: UE INFORMATION RESPONSE message including a Per Node/RAT Logs Retrieval Access Indicator (for the MgNB and the SgNB1), notifying that the MgNB has successfully retrieved all the UE MDT Logs.

In operation S1005, the SgNB1 aggregates all the retrieved UE MDT Logs and then directly reports the aggregated MDT Logs to an upstream TCE directly connected to the SgNB1 for processing. In the process that the MeNB and SgNB1 cooperate to retrieve MDT Logs, there is no need for the MgNB to retrieve or report to the TCE any UE MDT Logs via its own SRB2 anymore.

Embodiment 4

In the embodiment, the UE is once in an NE-DC operation mode, that is, the UE is connected to both a master base station (e.g., MeNB) and a secondary base station (e.g., SgNB1) at the same time. The MgNB and the SeNB1 at the network side respectively configure the UE with Logged MDT-related configuration information (e.g. the target E-UTRA and NR frequency points to be detected, effective physical and temporal range, etc.) independently according to the requirements of their respective RAT deployment and network management, and then the UE stores the Per Node/RAT Logged MDT-related configuration information of the MgNB and the SeNB1.

Figure 11:
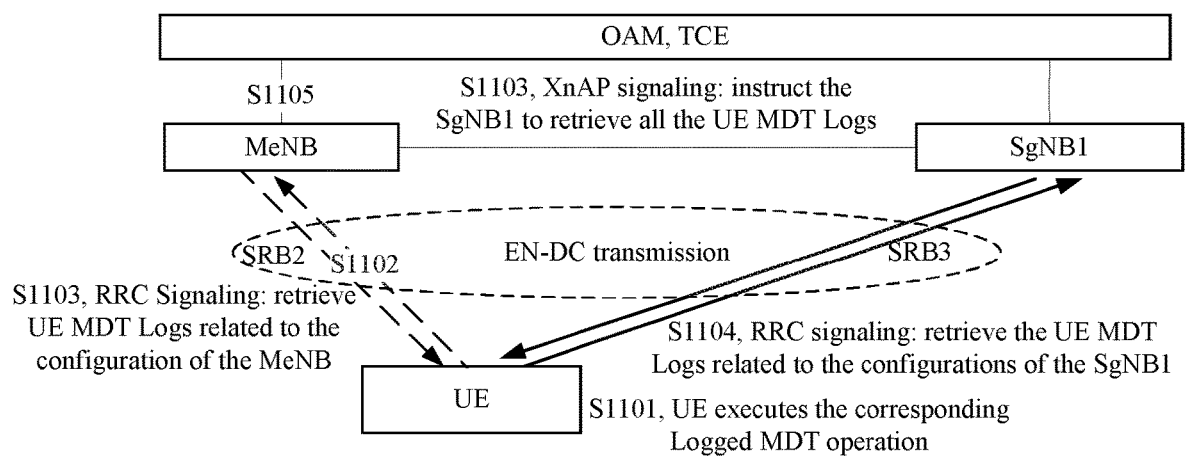
FIG. 11 is a schematic diagram of retrieving UE MDT Logs via SRB2 and SRB3 respectively according to embodiment 4 of the present disclosure.

As shown in FIG. 11, the embodiment includes operations S1101 to S1105 which are described in detail as follows.

In operation S1101, when transmission of user plane data ends, UE exits an NE-DC operation mode, transits to an RRC Inactive state, starts to execute Logged MDT operations respectively corresponding to related configurations of an MgNB and an SeNB1 Per Node/RAT, and respectively records and stores MDT Logs in a local table 1 and a local table 2 in a manner of being decoupled from one another.

In operation S1102, transmission of user plane data restarts, the UE transits back to the RRC Connected state and quickly transits to the NE-DC operation mode, and the UE reports the Per Node/RAT Logs Available Indicator (for the MgNB and the SeNB1) to the MgNB via an SRB1: RRC Resume Complete message, indicating that the local tables 1 and 2 of the UE respectively record and store MDT Logs, which are respectively generated based on the configurations of the MgNB and the SeNB1, to be retrieved by the network side.

In operation S1103, the MgNB decides to respectively use the SRB2 at the MgNB side and the SRB3 at the SeNB1 side to cooperatively retrieve the UE MDT Logs, and thus sends an XnAP: UE INFORMATION REQUEST message to the SeNB1 by a UE Information procedure newly introduced on the XnAP. The message includes a Per Node/RAT Logs Available Indicator (for SeNB1), which is used for requesting the SeNB1 to retrieve the UE MDT Logs related to the configuration of the SeNB1. The XnAP: UE Information Request message sent by the MgNB also indicates that the SeNB1 needs to return the retrieved MDT Logs, and subsequently returns the MDT Logs to the MgNB by an XnAP: UE Information procedure. Meanwhile, the MgNB retrieves the UE MDT Logs related to the MgNB configuration via its own SRB2, and subsequently directly uploads the MDT Logs to the TCE by an appropriate procedure.

In operation S1104, according to the instruction of the XnAP message of the MgNB, the SeNB1 retrieves the UE MDT Logs related to the configuration of the SeNB1 by the UE Information procedure at the air interface on its own SRB3. After successful retrieval, the SeNB1 sends to the MgNB an XnAP: UE INFORMATION RESPONSE message. The message includes a Per Node/RAT Logs Retrieval Access Indicator (for the MgNB and the SeNB1), so as to notify that the MgNB has successfully retrieved the UE MDT Logs related to the configuration of the SeNB1. The message may further include the UE MDT Logs related to the configuration of the SeNB1, so as to collectively report the UE MDT Logs to the MgNB.

In operation S1105, the MgNB aggregates the UE MDT Logs retrieved from its own SRB2 at the air interface and the UE MDT Logs retrieved by the SeNB1 via SRB3, and then directly reports the aggregated MDT Logs to the upstream TCE connected to the MgNB for processing. In the process that the MgNB and the SeNB1 cooperate to retrieve MDT Logs, the MgNB still needs to collect and report to the TCE all the UE MDT Logs via its own SRB2.

Embodiment 5

In this embodiment, the UE is once in a Intra-gNB NR-DC operation mode, that is, the UE is connected to both a master base station (e.g., MgNB-CU/DU) (at a low frequency) and a secondary base station (e.g., gNB-DU1) (at a high frequency, which is controlled by the same MgNB). The MgNB at the network side respectively configure the UE with Logged MDT-related configuration information (such as target NR high/low frequency points to be detected, effective physical and temporal ranges, etc.) independently according to the requirements of their respective RAT deployment and network management, and then the UE stores the Per Node/RAT Logged MDT-related configuration information of the MgNB-CU/DU and the gNB-DU1.

Figure 12:
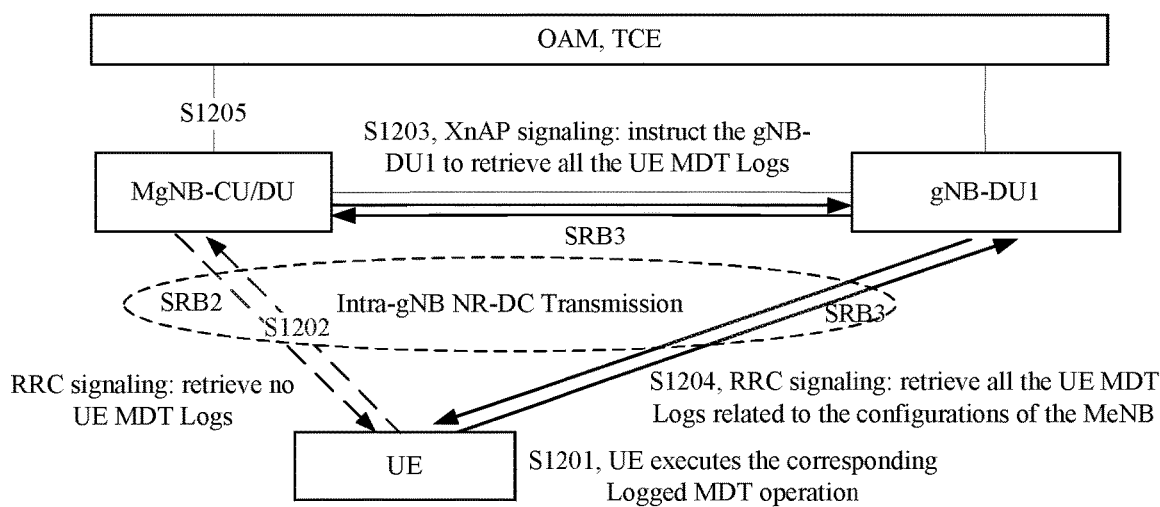
FIG. 12 is a flowchart of retrieving all the UE MDT Logs via the SRB3 according to embodiment 5 of the present disclosure.

As shown in FIG. 12, the embodiment includes operations S1201 to S1205 which are described in detail as follows.

In operation S1201, when transmission of user plane data ends, UE exits the Intra-gNB NR-DC operation mode, transits to an RRC Idle state, starts to execute Logged MDT operations respectively corresponding to Per Node/RAT related configurations of the MgNB-CU/DU and gNB-DU1, and respectively records and stores MDT Logs in a local table 1 and a local table 2 in a manner of being decoupled from one another.

In operation S1202, transmission of user plane data restarts, the UE transits back to the RRC Connected state and quickly transits to an Intra-gNB NR-DC operation mode, and the UE reports the Per Node/RAT Logs Available Indicator (for MgNB-CU/DU and gNB-DU1) to the MgNB-CU/DU via an SRB1: RRC Connection Complete message, indicating that the local tables 1 and 2 of the UE respectively record and store MDT Logs, which are respectively generated based on the configurations of the MgNB-CU/DU and gNB-DU1, to be retrieved by the network side.

In operation S1203, the MgNB decides to use the SRB3 of the gNB-DU1 to retrieve all the UE MDT Logs, so that the MgNB-CU/DU sends an F1AP: DL RRC INFORMATION TRANSFER message to the gNB-DU1 by means of downlink (DL) RRC Information Transfer procedure of the F1AP. The message includes an RRC: UE INFORMATION REQUEST message which is used for requesting the gNB-DU1 to retrieve all the UE MDT Logs related to the MgNB.

In operation S1204, according to the instruction of the F1AP message of the MgNB, the gNB-DU1 retrieves all the UE MDT Logs related to the MgNB by an UE Information procedure at the air interface on its own SRB3. In the retrieval process, the gNB-DU1 sends an F1AP: UL RRC Information TRANSFER message to the MgNB-CU/DU by an uplink (UL) RRC Information Transfer procedure of the F1AP. The message includes an RRC: UE INFORMATION RESPONSE message, and includes all the UE MDT Logs related to the MgNB.

In operation S1205, the MgNB-CU/DU aggregates all the retrieved UE MDT Logs and then directly reports the aggregated MDT Logs to an upstream TCE for processing.

In the process that the MgNB-CU/DU and the gNB-DU1 cooperate to retrieve MDT Logs, there is no need for the MgNB-CU/DU to collect any UE MDT Logs via its own SRB2.

Through the above description of the embodiments, it should be clearly appreciated by the person skilled in the art that the method according to the embodiments may be implemented by means of software in connection with the required universal hardware platform, and of course, can also be implemented by hardware, but in many cases the former is a more exemplary implementation. Based on this understanding, the essence of the techniques or the contributions to current technologies under the present disclosure may be implemented in the form of software products. Such software product may be stored in one or more computer storage media (such as an ROM, an RAM, a magnetic disk, or an optical disc), and include several instructions to request a terminal device (such as a cell phone, a personal computer, a server, or a network device) to implement methods of the embodiments.

In some embodiments of the present disclosure, provided is an MDT Logs reporting device, the device is used for implementing the embodiments and exemplary embodiments above, and what has been described will not be described repeatedly here. As used below, the term "module" may implement a combination of software and/or hardware of a predetermined function. Although the device described in the following embodiments is preferably implemented by software, implementation of hardware or a combination of software and hardware is also possible and conceived.

Figure 13:
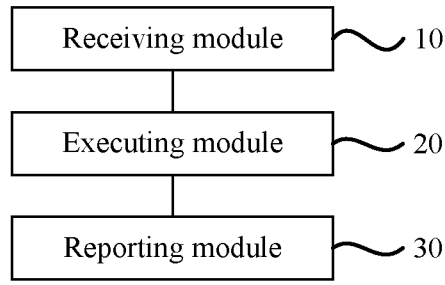
FIG. 13 is a structural block diagram of a MDT Logs reporting device according to some embodiments of the present disclosure.

FIG. 13 is a structural block diagram of an MDT Logs reporting device according to some embodiments of the present disclosure. The device is located in UE. As shown in FIG. 13, the device includes a receiving module 10, an executing module 20 and a reporting module 30.

The receiving module 10 is configured to receive first Logged MDT configuration information configured by a master base station for the UE, receive second Logged MDT configuration information configured by one or more secondary base stations for the UE, wherein the UE is in a multi-connection operation mode in which the UE is connected to the master base station and the one or more secondary base stations at the same time.

The executing module 20 is configured to execute a first Logged MDT operation according to the first Logged MDT configuration information to acquire first MDT Logs, and execute a second Logged MDT operation according to the second Logged MDT configuration information acquire second MDT Logs.

The reporting module 30 is configured to report the first MDT Logs and/or the second MDT Logs to the master base station and/or the one or more secondary base stations according to an instruction of the master base station.

Figure 14:
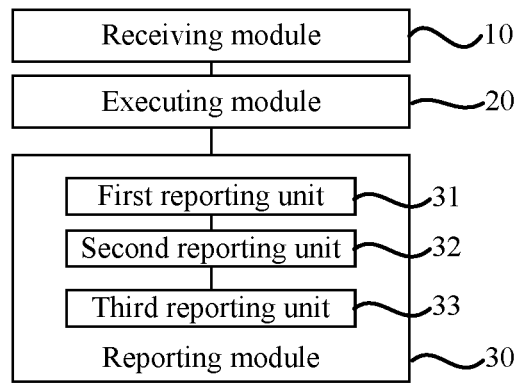
FIG. 14 is a structural block diagram of a MDT Logs reporting device according to some other embodiments of the present disclosure.

FIG. 14 is a structural block diagram of an MDT Logs reporting device according to some other embodiments of the present disclosure. As shown in FIG. 14, in addition to the receiving module 10, the executing module 20 and the reporting module 30 shown in FIG. 13, the reporting module 30 is further configured to report a first MDT Logs available indicator and/or a second MDT Logs available indicator to the master base station and/or the one or more secondary base stations, so as to wait for the master base station and/or the one or more secondary base stations to retrieve the first MDT Logs and/or the second MDT Logs.

In the embodiment, the reporting module 30 further includes one of the following: a first reporting unit 31, configured to report the first MDT Logs and the second MDT Logs to the master base station, to enable the first MDT Logs and the second MDT Logs to be processed by the master base station; a second reporting unit 32, configured to report the first MDT Logs to the master base station, and report the second MDT Logs to the one or more secondary base stations, to enable the first MDT Logs and the second MDT Logs to be further processed by the master base station and the one or more secondary base stations respectively; a third reporting unit 33, configured to report the first MDT Logs and the second MDT Logs to the one or more secondary base stations, to enable the first MDT Logs and the second MDT Logs to be further processed by the secondary base station.

Figure 15:
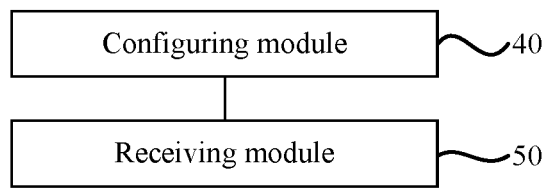
FIG. 15 is a structural block diagram of a MDT Logs reporting control device according to some embodiments of the present disclosure.

Some embodiments of the present disclosure further provide a MDT Logs reporting device. The device is located at a network side. As shown in FIG. 15, the device includes a configuring module 40 and a receiving module 50.

The configuring module 40 is adapted to configure first Logged MDT configuration information for UE through a master base station; and configure second Logged MDT configuration information for the UE through one or more secondary base stations, wherein the UE is in a multi-connectivity operation mode in which the UE is connected to the master base station and the one or more secondary base stations at the same time.

The receiving module 50 is adapted to receive, through the master base station and/or the one or more secondary base stations, first MDT Logs and/or second MDT Logs reported by the UE, wherein the first MDT Logs are MDT Logs acquired by the UE by executing a first Logged MDT operation, and the second MDT Logs are MDT Logs acquired by the UE by executing a second Logged MDT operation.

Figure 16:
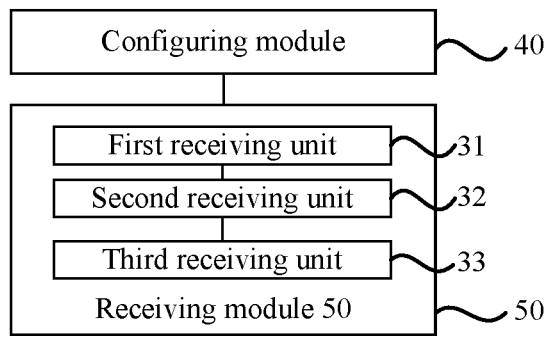
FIG. 16 is a structural block diagram of a MDT Logs reporting control device according to some other embodiments of the present disclosure.

FIG. 16 is a structure diagram of an MDT Logs reporting device according to some other embodiments of the present disclosure. As shown in FIG. 16, in addition to the configuring module 40 and the receiving module 50 shown in FIG. 15, the receiving module is further configured to receive, through the master base station and/or the one or more secondary base stations, a first MDT Logs available indicator and/or a second MDT Logs available indicator sent by the UE.

In this embodiment, the receiving module 60 further includes one of the following:
- a first receiving unit 61, configured to initiate a UE Information procedure on a signaling radio bearer of the master base station, retrieve the first MDT Logs and the second MDT Logs from the UE, and jointly report the first MDT Logs and the second MDT Logs to the TCE;
- a second receiving unit 62, configured to initiate a UE Information procedure on a signaling radio bearer of the one or more secondary base stations, retrieve the first MDT Logs and the second MDT Logs from the UE, and jointly report the first MDT Logs and the second MDT Logs to the TCE;
- a third receiving unit 63, configured to initiate a UE Information procedure on a signaling radio bearer of the master base station, retrieve the first MDT Logs from the UE, initiate a UE Information procedure on a radio bearer of one or more secondary base stations, retrieve the second MDT Logs from the UE.

It should be noted that each module may be implemented by software or hardware. The latter may be implemented in the following manner, but is not limited thereto. All the modules are located in a same processor; or, the modules are located in different processors in an arbitrary combination.

Some embodiments of the present disclosure further provide a storage medium. The storage medium stores a computer program, wherein the computer program is configured to execute any one of the method embodiments during running.

In some exemplary embodiments, the storage medium may include, but is not limited to, any medium that can store a computer program, such as a USB flash drive, a Read-Only Memory (ROM), a Random Access Memory (RAM), a removable hard disk, a magnetic disk, or an optical disc.

Some embodiments of the present disclosure also provide an electronic device, including a memory and a processor, wherein the memory stores a computer program, and the processor is configured to run the computer program, so as to execute any one of the method embodiments.

Those having ordinary skill in the art should understand that the modules or operations in some embodiments of the present disclosure can be implemented by using a general computing device, and they can be integrated in a single computing device, and can also be distributed over a network consisting of a plurality of computing devices. Optionally, they may be implemented by using executable program codes of the computing devices. Thus, they can be stored in a storage device and executed by the computing devices. Furthermore, in some cases, the shown or described operations may be executed in an order different from that described here, or they can be respectively implemented by individual Integrated Circuit modules, or they can be implemented by making a plurality of the modules or operations into a single Integrated Circuit module. Thus, the present disclosure is not limited to any particular combination of hardware and software.

The foregoing descriptions are merely exemplary embodiments of the present disclosure, but are not intended to limit the present disclosure. For those skilled in the art, the present disclosure may have various modifications and variations. Any modifications, equivalent replacements, improvements and the like made within the principle of the present disclosure shall belong to the scope of protection of the present disclosure.

What is claimed is:

1. A Minimization of Driving Test (MDT) Logs reporting method, comprising:
    receiving, by User Equipment (UE), first Logged MDT configuration information configured by a master base station for the UE, and receiving, by the UE, second Logged MDT configuration information configured by at least one secondary base station for the UE, wherein the UE is in a multi-connectivity operation mode in which the UE is connected to the master base station and the at least one secondary base station at the same time;
    exiting, by the UE, the multi-connectivity operation mode, executing, by the UE, a first Logged MDT operation according to the first Logged MDT configuration information to acquire first MDT Logs, and executing, by the UE, a second Logged MDT operation according to the second Logged MDT configuration information to acquire second MDT Logs; and
    re-establishing, by the UE, the multi-connectivity operation mode with a current master base station and at least one current secondary base station, and reporting, by the UE, the first MDT Logs or the second MDT Logs to the current master base station or the at least one current secondary base station.

2. The method according to claim 1, wherein exiting, by the UE, the multi-connectivity operation mode, executing, by the UE, the first Logged MDT operation according to the first Logged MDT configuration information to acquire the first MDT Logs, and executing, by the UE, the second Logged MDT operation according to the second Logged MDT configuration information to acquire the second MDT Logs comprises:

exiting, by the UE, the multi-connectivity operation mode and entering, by the UE, a Radio Resource Control Idle (RRC Idle) state or a Radio Resource Control Inactive (RRC Inactive) state;

respectively executing, by the UE, the first Logged MDT operation and the second Logged MDT operation to acquire the first MDT Logs and the second MDT Logs; and locally storing, by the UE, the first MDT Logs and the second MDT Logs respectively.

3. The method according to claim 1, wherein before reporting, by the UE, the first MDT Logs or the second MDT Logs to the current master base station or the at least one current secondary base station, the method further comprises:

returning, by the UE, to a Radio Resource Control Connected (RRC Connected) state, entering, by the UE, the multi-connectivity operation mode, and establishing, by the UE, new radio links with the current master base station and the at least one current secondary base station; and sending, by the UE, a first MDT Logs available indicator or a second MDT Logs available indicator to the current master base station or the at least one current secondary base station, so as to wait for the current master base station or the at least one current secondary base station to retrieve the first MDT Logs or the second MDT Logs by means of a dedicated signaling procedure.

4. The method according to claim 1, wherein reporting, by the UE, the first MDT Logs or the second MDT Logs to the current master base station or the at least one current secondary base station comprises one of the following:

reporting, by the UE, the first MDT Logs and the second MDT Logs to the current master base station, to enable the first MDT Logs and the second MDT Logs to be processed by the current master base station;

reporting, by the UE, the first MDT Logs to the current master base station, and reporting, by the UE, the second MDT Logs to the at least one current secondary base station, to enable the first MDT Logs and the second MDT Logs to be processed by the current master base station and the at least one current secondary base station; and reporting, by the UE, the first MDT Logs and the second MDT Logs to the at least one current secondary base station, to enable the first MDT Logs and the second MDT Logs to be processed by the at least one current secondary base station.

5. A non-transitory storage medium storing a computer program, wherein the computer program is configured to execute the method according to claim 1 at runtime.

6. A Minimization of Driving Test (MDT) Logs reporting control method, comprising:

configuring, by a master base station, first Logged MDT configuration information for User Equipment (UE), and sending, by the master base station, the first Logged MDT configuration information to the UE; and configuring, by at least one secondary base station, second Logged MDT configuration information for the UE, and sending, by the at least one secondary base station, the second Logged MDT configuration information to the UE, wherein the UE is in a multi-connectivity operation mode in which the UE is connected to the master base station and the at least one secondary base station at the same time; and receiving, by the master base station or the at least one secondary base station, the first MDT Logs or the second MDT Logs reported by the UE, wherein the first MDT Logs are MDT Logs acquired by the UE by executing a first Logged MDT operation according to the first Logged MDT configuration information, and the second MDT Logs are MDT Logs acquired by the UE by executing a second Logged MDT operation according to the second Logged MDT configuration information;

wherein before receiving, by the master base station or the at least one secondary base station, the first MDT Logs or the second MDT Logs reported by the UE, the method further comprises:

receiving, by the master base station or the at least one secondary base station, a first MDT Logs available indicator or a second MDT Logs available indicator sent by the UE;

determining, by a base station receiving the MDT Logs available indicator, a retrieval mode of the first MDT Logs or the second MDT Logs, and retrieving, by the master base station or the at least one secondary base station, the first MDT Logs or the second MDT Logs according to the determined retrieval mode.

7. The method according to claim 6, wherein retrieving, by the master base station or the at least one secondary base station, the first MDT Logs or the second MDT Logs according to the determined retrieval mode comprises:

initiating, by the master base station, a UE Information procedure on a signaling radio bearer of the master base station, retrieving, by the master base station, the first MDT Logs and the second MDT Logs from the UE, and jointly reporting, by the master base station, the first MDT Logs and the second MDT Logs to a Trace Collection Entity (TCE).

8. The method according to claim 7, wherein in cases where the master base station and the at least one secondary base station are base stations of different Radio Access Technologies (RATs), the second MDT Logs are carried on the signaling radio bearer of the master base station in a form of an information element of a Radio Resource Control Container (RRC Container).

9. The method according to claim 6, wherein retrieving, by the master base station or the at least one secondary base station, the first MDT Logs or the second MDT Logs according to the determined retrieval mode comprises:

initiating, by the at least one secondary base station, a UE Information procedure on a signaling radio bearer of the at least one secondary base station, retrieving, by the at least one secondary base station, the first MDT Logs and the second MDT Logs from the UE, and jointly reporting, by the at least one secondary base station, the first MDT Logs and the second MDT Logs to a Trace Collection Entity (TCE).

10. The method according to claim 9, wherein in cases where the master base station and the at least one secondary base station are base stations of different RATs, the first MDT Logs are packaged and carried on the signaling radio bearer of the master base station in a form of an information element a Radio Resource Control Container (RRC Container).

11. The method according to claim 9, wherein before initiating, by the at least one secondary base station, the UE Information procedure on the signaling radio bearer of the at least one secondary base station, the method further comprises:

notifying, by the master base station, the at least one secondary base station of a first MDT Logs available indicator and a second MDT Logs available indicator, and instructing, by the master base station, the at least one secondary base station to allow the UE Information procedure to be initiated on the signaling radio bearer of the at least one secondary base station.

12. The method according to claim 9, further comprising one of:

sending, by the at least one secondary base station, the collected first MDT Logs or second MDT Logs to the master base station, and reporting, by the master base station, the first MDT Logs or the second MDT Logs to the TCE;

sending, by the master base station, the collected first MDT Logs or second MDT Logs to the at least one secondary base station, and reporting, by the at least one secondary base station, the first MDT Logs or the second MDT Logs to the TCE; or reporting, by the at least one secondary base station, the first MDT Logs or the second MDT Logs to the TCE directly.

13. The method according to claim 6, wherein retrieving, by the master base station or the at least one secondary base station, the first MDT Logs or the second MDT Logs according to the determined retrieval mode comprises:

initiating, by the master base station, a UE Information procedure on a signaling radio bearer of the master base station, and retrieving, by the master base station, the first MDT Logs from the UE; and initiating, by the at least one secondary base station, a UE Information procedure on a signaling radio bearer of the at least one secondary base station, and retrieving, by the at least one secondary base station, the second MDT Logs from the UE.

14. The method according to claim 13, before initiating, by the at least one secondary base station, the UE Information procedure on the radio bearer of the at least one secondary base station, the method further comprises:

notifying, by the master base station, the at least one secondary base station of a second MDT Logs available indicator, and instructing the at least one secondary base station to allow the UE Information procedure to be initiated on the signaling radio bearer of the at least one secondary base station.

15. A Minimization of Driving Test (MDT) Logs reporting control device, located at a network side and comprising a memory storing instructions and a processor in communication with the memory, wherein the processor is configured to execute the instructions to perform the method according to claim 6.

16. A non-transitory storage medium storing a computer program, wherein the computer program is configured to execute the method according to claim 6 at runtime.

17. A Minimization of Driving Test (MDT) Logs reporting device, located in User Equipment (UE) and comprising a memory storing instructions and a processor in communication with the memory, wherein the processor is configured to execute the instructions to:

receive first Logged MDT configuration information configured by a master base station for the UE, and receive second Logged MDT configuration information configured by at least one secondary base station for the UE, wherein the UE is in a multi-connectivity operation mode in which the UE is connected to the master base station and the at least one secondary base station at the same time;

after the UE exits the multi-connectivity operation mode, execute a first Logged MDT operation according to the first Logged MDT configuration information to acquire first MDT Logs, and execute a second Logged MDT operation according to the second Logged MDT configuration information to acquire second MDT Logs; and report, in cases where the UE re-establishes the multi-connectivity operation mode with a current master base station and at least one current secondary base station, the first MDT Logs or the second MDT Logs to the current master base station or the at least one current secondary base station.

18. The device according to claim 15, wherein the processor is further configured to execute the instructions to:

send a first MDT Logs available indicator or a second MDT Logs available indicator to the current master base station or the at least one current secondary base station, so as to wait for the current master base station or the at least one current secondary base station to retrieve the first MDT Logs or the second MDT Logs by means of a dedicated signaling procedure.

19. The device according to claim 17, wherein the processor, when being configured to report the first MDT Logs or the second MDT Logs to the current master base station or the at least one current secondary base station, is configured to execute the instructions to:

report the collected first MDT Logs and the collected second MDT Logs to the current master base station, to enable the first MDT Logs and the second MDT Logs to be processed by the current master base station;

report the collected first MDT Logs to the current master base station, and report the collected second MDT Logs to the at least one current secondary base station, to enable the first MDT Logs and the second MDT Logs to be processed by the current master base station and the at least one current secondary base station; or report the collected first MDT Logs and the collected second MDT Logs to the at least one current secondary base station, to enable the first MDT Logs and the second MDT Logs to be processed by the at least one current secondary base station.

* * * * *